(12) United States Patent
Bates et al.

(10) Patent No.: US 8,991,147 B2
(45) Date of Patent: Mar. 31, 2015

(54) AUGMENTED TRACK TO FACILITATE REMOVAL OF STIFFENING LAYERS FROM A CABLE RETAINED IN THE TRACK

(75) Inventors: Allen K. Bates, Tucson, AZ (US);
Daniel J. Winarski, Tucson, AZ (US);
George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 12/186,150

(22) Filed: Aug. 5, 2008

(65) Prior Publication Data

US 2010/0032530 A1 Feb. 11, 2010

(51) Int. Cl.
*H02G 11/00* (2006.01)
*H02G 3/04* (2006.01)

(52) U.S. Cl.
CPC .............. *H02G 3/0487* (2013.01); *H02G 11/00* (2013.01)
USPC .................................. 59/78.1; 248/49; 174/24

(58) Field of Classification Search
USPC ............. 248/49, 51, 74.3, 499, 68.1; 59/78.1;
138/110, 120, 155; 174/24, 99 R, 100,
174/19, 72 A, 126.1, 68.3, 101, 135; 100/1,
100/26
See application file for complete search history.

(56) References Cited

U.S. PATENT DOCUMENTS

| | | | |
|---|---|---|---|
| 3,023,692 A * | 3/1962 | Lionel | 100/1 |
| 4,039,131 A | 8/1977 | Perrault et al. | |
| 4,198,812 A * | 4/1980 | Hennig et al. | 59/78.1 |
| 4,564,163 A | 1/1986 | Barnett | |
| 5,516,986 A * | 5/1996 | Peterson et al. | 174/113 C |
| 5,740,994 A | 4/1998 | Laughlin | |
| 5,873,550 A | 2/1999 | Phillips | |
| 6,459,037 B2 * | 10/2002 | Muller et al. | 174/19 |
| 6,708,480 B1 * | 3/2004 | Wehler | 59/78.1 |
| 6,725,642 B2 * | 4/2004 | Tsutsumi et al. | 59/78.1 |
| 6,745,555 B2 * | 6/2004 | Hermey et al. | 59/78.1 |
| 6,802,480 B1 | 10/2004 | Martello | |
| 6,949,898 B2 | 9/2005 | Inui et al. | |
| 7,172,456 B1 | 2/2007 | Nagy | |
| 7,204,075 B2 * | 4/2007 | Utaki | 59/78.1 |
| 7,559,340 B2 * | 7/2009 | Ikeda et al. | 138/110 |
| 2005/0274850 A1 * | 12/2005 | Blase et al. | 248/65 |
| 2007/0103810 A1 * | 5/2007 | Starr et al. | 360/92 |
| 2008/0017397 A1 * | 1/2008 | Komiya et al. | 174/24 |

* cited by examiner

*Primary Examiner* — Ingrid M Weinhold
(74) *Attorney, Agent, or Firm* — Cantor Colburn LLP; Bryan Bornick

(57) ABSTRACT

An apparatus to support a cable is provided and includes a channel shaped track, in which the cable is retained, which is formed to define a plurality of pairs of holes on opposing sides of the track at substantially equal intervals and slots that each extend from respective tops of each of the holes to an exterior surface of the track, and a plurality of support members, each of which extends across the track and between at least a portion of adjacent pairs of the holes, to thereby be respectively positioned to prevent the cable from propagating toward the exterior surface of the track.

16 Claims, 4 Drawing Sheets

130

Figure 1A:
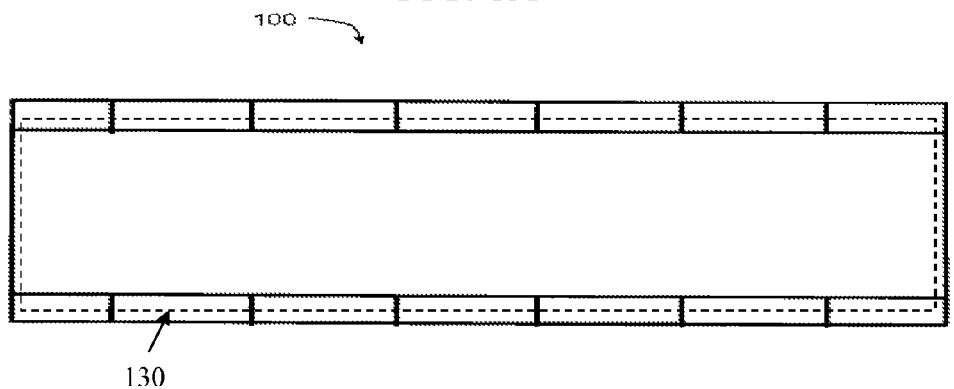

AUGMENTED TRACK TO FACILITATE REMOVAL OF STIFFENING LAYERS FROM A CABLE RETAINED IN THE TRACK

BACKGROUND

Aspects of the present invention are directed to a track which is augmented and facilitates a removal of stiffening layers from a cable retained therein.

In general, automated tape libraries need to run cables through profile tracks, which may be required to flexibly and repeatedly bend at various locations. These cables may be used for command-and-control communications as well as data communications, so their integrity must be maintained constantly, to provide continuous customer-access to data. Since the tracks are typically used to retain the cables therein, the tracks are additionally required to bend with a uniform bending radius. The uniformity of the bending radius decreases a likelihood that the cables will kink or otherwise fail. As such, the tracks partially serve to prevent fatigue failures in the cables.

Recently, due to requirements that the tape libraries be reduced in size and/or provided with increased storage capacity, it has been seen that a need exists to reduce a size of the bending radius. The size reduction of the bending radius has been accomplished by a removal of stiffening layers of, e.g., polyimide, from the cables. However, it has also been seen that the removal of these stiffening layers causes cable-retention problems for the tracks.

SUMMARY

In accordance with an aspect of the invention, an apparatus to support a cable is provided and includes a channel shaped track, in which the cable is retained, which is formed to define a plurality of pairs of holes on opposing sides of the track at substantially equal intervals and slots that each extend from respective tops of each of the holes to an exterior surface of the track, and a plurality of support members, each of which extends across the track and between at least a portion of adjacent pairs of the holes, to thereby be respectively positioned to prevent the cable from propagating toward the exterior surface of the track.

In accordance with another aspect of the invention, a tape library is provided and includes a cable, a channel shaped track, in which the cable is retained, which is formed to define a plurality of pairs of holes on opposing sides of the track at substantially equal intervals and slots that each extend from respective tops of each of the holes to an exterior surface of the track, and a plurality of support members, each of which extends across the track and between at least a portion of adjacent pairs of the holes, to thereby be respectively positioned to prevent the cable from propagating toward the exterior surface of the track.

In accordance with yet another aspect of the invention, a method of retaining a cable is provided and includes snaking the cable into a channel shaped track defining a plurality of pairs of holes on opposing sides of the track at substantially equal intervals and slots that each extend from respective tops of each of the holes to an exterior surface of the track, and inserting each of a plurality of support members into the track to extend across the track and between at least a portion of adjacent pairs of the holes to thereby be respectively positioned to prevent the cable from propagating toward the exterior surface of the track.

BRIEF DESCRIPTIONS OF THE SEVERAL VIEWS OF THE DRAWINGS

Figure 1B:
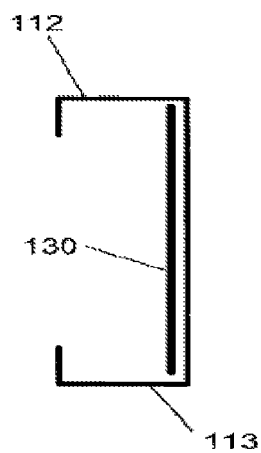
Figure 1C:
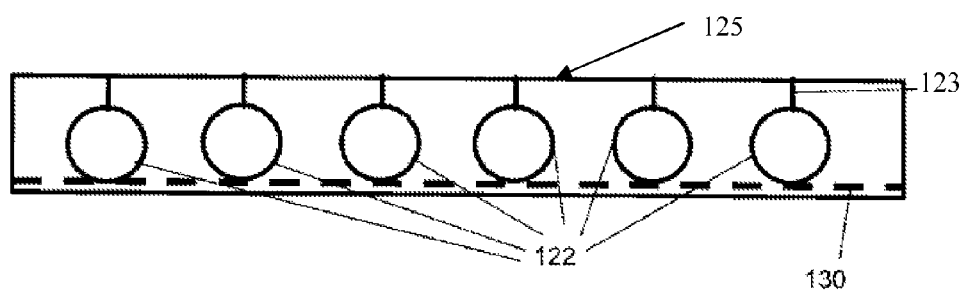
Figure 2:
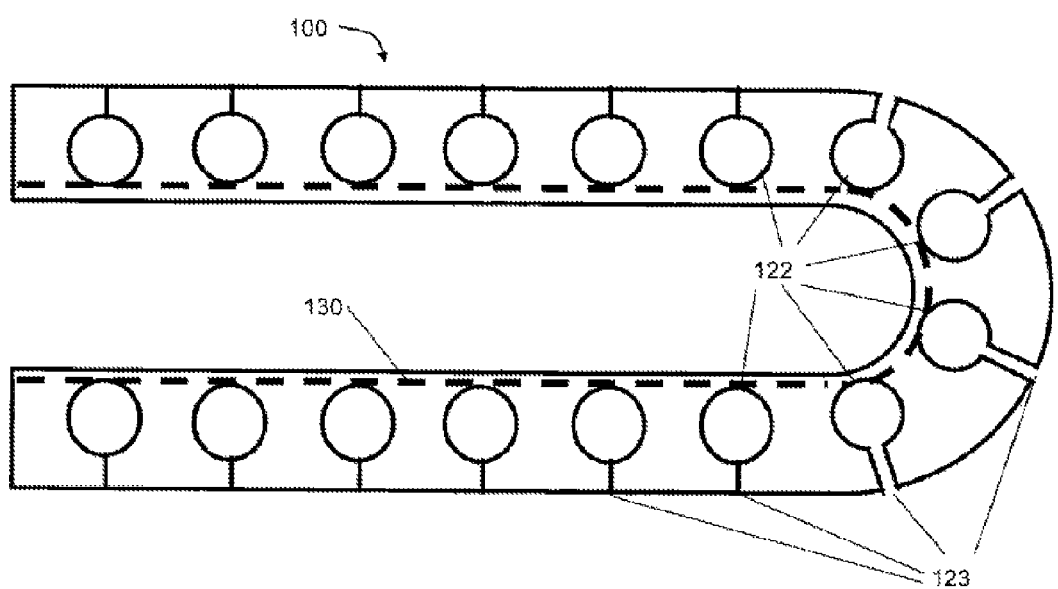
Figure 3A:
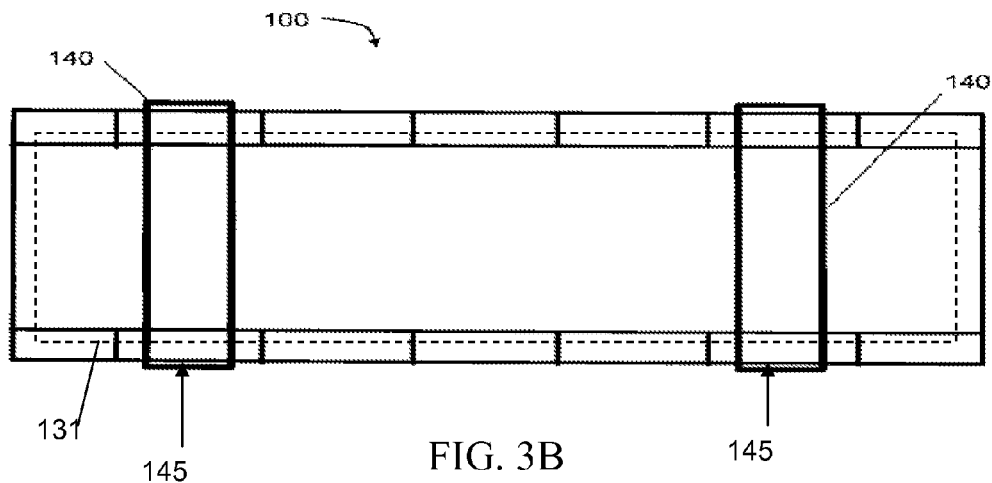
Figure 3B:
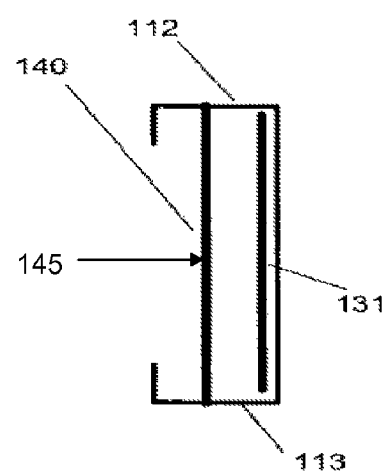
Figure 3C:
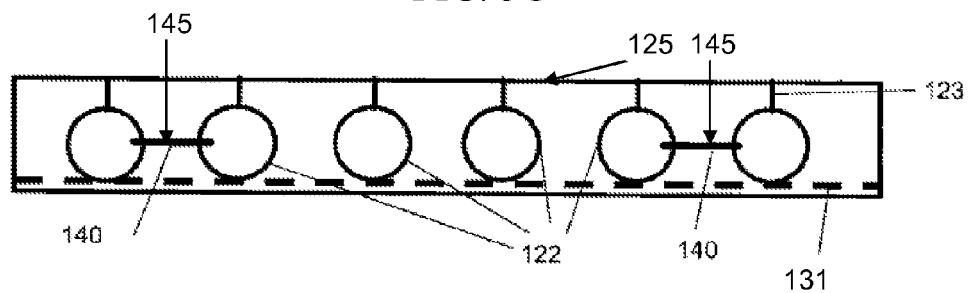
Figure 4A:
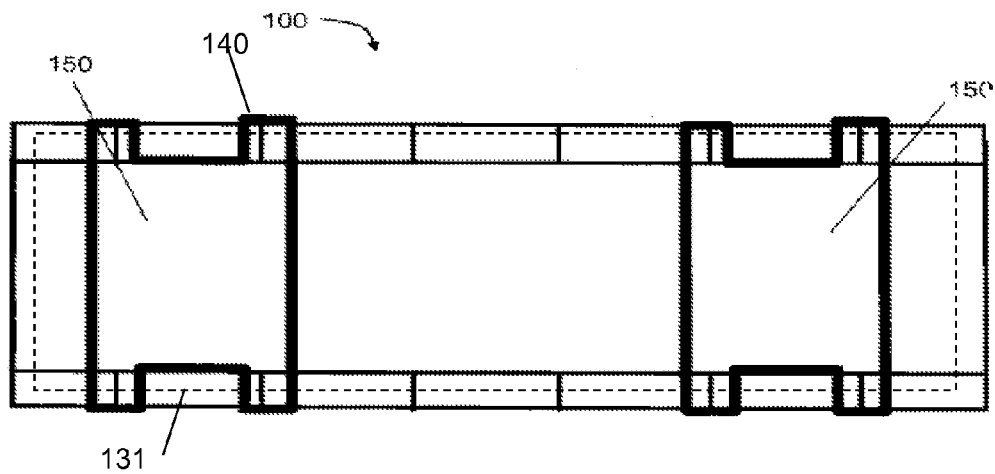
Figure 4B:
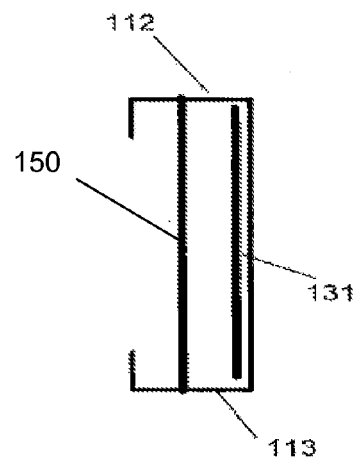
Figure 4C:
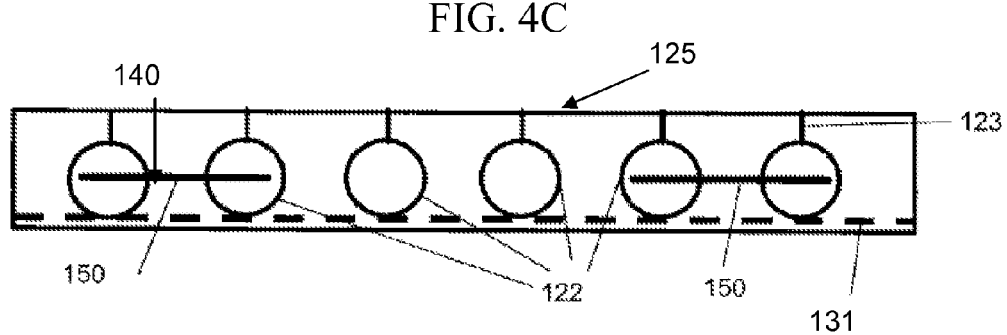

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIGS. 1A-C are top, cross-sectional and side views of a profile track;

FIG. 2 is a side view of the profile track of FIGS. 1A-C in a bent condition;

FIGS. 3A-C are top, cross-sectional and side views of a profile track in accordance with an embodiment of the invention; and FIGS. 4A-C are top, cross-sectional and side views of a profile track in accordance with another embodiment of the invention.

DETAILED DESCRIPTION

With reference to FIGS. 1A-C and 2, it may be seen that cable 130 is retained in track 100. Side walls 112 and 113 are each defined with a plurality of pairs of holes 122 that are substantially equally spaced from one another and an equal number of slots 123. The slots 123 extend from the respective tops of the holes 122 toward respective tops of side walls 112 and 113 which are coplanar with an exterior surface of the track 100. The holes 122 and slots 123 spread open along any bends in the track 100 and thereby allow the track 100 to bend at a uniform radius, as shown in FIG. 2, so that the cable 130 retained therein does not kink or otherwise fail.

With reference to FIGS. 3A-C, where the bending radius of the track 100 is to be reduced, it has been seen that stiffening layers of the cable 130 may be removed therefrom to form cable 131. These stiffening layers are typically the outermost layers of a cable, thus the removal of the stiffening layers significantly reduces the areal moment of inertia of the cable which makes the cable much more compliant. This increased compliance of the cable reduces the bending stresses, which increases the fatigue life of the cable. A result of such removal, however, is that the cable 131 may be excessively compliant and therefore unlikely to remain retained within the track 100 as in the configuration shown in FIG. 2.

Accordingly, an apparatus to support a cable 131 is provided and includes a track 100, such as a channel shaped track, in which the cable 131 is retained. The track 100 is formed to define a plurality of pairs of holes 122 on opposing sides 112 and 113 of the track 100 at substantially equal intervals and slots 123 that each extend from respective tops of each of the holes 122 to an exterior surface 125 of the track 100. Here, exterior surface 125 is the top surface of side wall 112 and side wall 113. A plurality of support members 140 each extends across the track 100 and between adjacent pairs of the holes 122. The support members 140 are thereby respectively positioned to prevent the cable 131 from propagating toward the exterior surface of the track 100 at, e.g., a bend in the track 100.

In accordance with an embodiment of the invention, the support members 140 may include elastomeric o-rings 145. Such elastomeric o-rings 145 may be formed of materials such as, e.g., vulcanized latex. In further detail, the elastomeric o-rings 145 may be formed of materials that provide the elastomeric o-rings 145 with a linear spring rate characteristic that ranges from about 10-100 Newtons/meter.

In accordance with another embodiment of the invention, as shown in FIGS. 4A-C, the support members 140 may include dog-bone shaped inserts 150. The dog-bone shaped 150 inserts may be formed of materials such as plastic or have similar physical characteristics as those of the elastomeric o-rings 145.

Each of the elastomeric rings 145 may be inserted into the track 100 through a first one of the slots 123 and into the corresponding hole 122. Then, a second side of the elastomeric ring 145 is inserted into an adjacent slot 123 and, subsequently, an adjacent hole 122. Once both sides of the elastomeric ring 145 are inserted into the adjacent holes 122, the elastomeric rings 145 may be designed to either fit tightly to adjacent opposing sides of the holes 122, as shown in FIG. 3A, or to float. In either case, the elastomeric rings 145 prevent the cable 131 from propagating through the holes 122 and the slots 123 and/or substantially reduce the likelihood of the same.

The dog-bone shaped inserts 150 are inserted into the holes 122 in a similar fashion as described above but, as specifically shown in FIG. 4A, are nearly sufficiently wide enough to stretch from one side of a first hole 122 to an opposing side of an adjacent hole 122. In this manner, the dog-shaped inserts 150 provide an additional level of control of the cable 131 within the holes 122.

It is understood that the support members 140 may include only elastomeric o-rings 145 or dog-bone shaped inserts 150 or combinations thereof. It is further understood that the holes 122 may each be provided with corresponding support members 140 or may be only sparsely populated with the support members 140 if it is seen that a full complement of support member 140 would be structurally unnecessary. It is still further understood that other configurations of the support members 140 are possible and that the invention is not limited to elastomeric o-rings 145 or dog-bone shaped inserts 150.

By way of the use of the support members 140, it has been seen that the cable 131 may be formed without stiffening layers. These stiffening layers may be those layers of the cable 131 that would be made of materials selected from the group consisting of polyimide and polyester. Since a bending potential of the cable 131 is, therefore, not limited by the presence of stiffening layers, it is understood that the cable 131 will be bendable to a maximum bending radius which is smaller than a previous bending radius by a significant degree. Concurrently, the track 100 may be flexibly and repeatedly bent within, e.g., an automated tape library, in one or more locations with a bending radius that is substantially equal to a maximum bending radius of the cable 131. Because of the increased compliance of cable 131, additional cycles of bending through the tape library will be possible. Therefore, it follows that the tape library will have a longer functioning life.

In accordance with another aspect of the invention, a tape library is provided and includes a cable 131 and a channel shaped track 100, in which the cable 131 is retained. The track 100 is formed to define a plurality of pairs of holes 122 on opposing sides 112 and 113 of the track 100 at substantially equal intervals and slots 123 that each extend from respective tops of each of the holes 122 to exterior surface 125 of the track. A plurality of support members 140 each extends across the track 100 and between adjacent pairs of the holes 122. The support members 140 are thereby respectively positioned to prevent the cable 131 from propagating toward the exterior surface of the track 100.

In accordance with another aspect of the invention, a method of retaining a cable 131 is provided and includes snaking the cable 131 into a channel shaped track 100 defining a plurality of pairs of holes 122 on opposing sides of the track at substantially equal intervals and slots 123 that each extend from respective tops of each of the holes 122 to an exterior surface of the track 100, inserting each of a plurality of support members 140 into the track 100 to extend across the track 100 and between adjacent pairs of the holes 122 to thereby be respectively positioned to prevent the cable 131 from propagating toward the exterior surface of the track 100. In accordance with this method, the cable 131 is formed without stiffening layers that would be formed of materials selected from the group consisting of polyimide and polyester.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. An apparatus to support a cable, the apparatus comprising:
   a channel shaped track, in which the cable is retained, which is formed to define a plurality of pairs of holes on opposing sides of the track at substantially equal intervals and slots that each extend from respective tops of each of the holes to an exterior surface of the track; and
   a plurality of support members, each of which includes a side and a second side that are respectively received in adjacent pairs of holes via corresponding ones of the slots of the adjacent pairs of holes such that the support member extends across the track and between at least a portion of the adjacent pairs of the holes, to thereby be respectively positioned to prevent the cable from propagating toward the exterior surface of the track, and,
   the support members comprise dog-bone shaped inserts and are configured to interfere with respective opposite sides of the adjacent pairs of the holes.

2. The apparatus according to claim 1, wherein the support members comprise elastomeric o-rings.

3. The apparatus according to claim 2, wherein the elastomeric o-rings comprise vulcanized latex.

4. The apparatus according to claim 2, wherein the elastomeric o-rings comprise a material such that the elastomeric o-rings have a linear spring rate ranging from about 10-100 Newtons/meter.

5. The apparatus according to claim 1, wherein the dog-bone shaped inserts comprise plastic.

6. The apparatus according to claim 1, wherein the cable is formed without stiffening layers.

7. The apparatus according to claim 1, wherein the cable is formed without stiffening layers formed of materials selected from the group consisting of polyimide and polyester.

8. The apparatus according to claim 7, wherein the track bends in one or more location with a bending radius that is substantially equal to a maximum bending radius of the cable.

9. An apparatus, comprising:
   a cable;
   a channel shaped track, in which the cable is retained, which is formed to define a plurality of pairs of holes on opposing sides of the track at substantially equal intervals and slots that each extend from respective tops of each of the holes to an exterior surface of the track; and a plurality of support members, each of which includes a side and a second side that are respectively received in adjacent pairs of holes via corresponding ones of the slots of the adjacent pairs of holes such that the support member extends across the track and between at least a portion of the adjacent pairs of the holes, to thereby be respectively positioned to prevent the cable from propagating toward the exterior surface of the track, and, the support members comprise dog-bone shaped inserts and are configured to interfere with respective opposite sides of the adjacent pairs of the holes.

10. The apparatus according to claim 9, wherein the support members comprise elastomeric o-rings.

11. The apparatus according to claim 10, wherein the elastomeric o-rings comprise vulcanized latex.

12. The apparatus according to claim 10, wherein the elastomeric o-rings comprise a material such that the elastomeric o-rings have a linear spring rate ranging from about 10-100 Newtons/meter.

13. The apparatus according to claim 9, wherein the dog-bone shaped inserts comprise plastic.

14. The apparatus according to claim 9, wherein the cable is formed without stiffening layers.

15. The apparatus according to claim 9, wherein the cable is formed without stiffening layers formed of materials selected from the group consisting of polyimide and polyester.

16. The apparatus according to claim 15, wherein the track bends in one or more location with a bending radius that is substantially equal to a maximum bending radius of the cable.

* * * * *